United States Patent [19]

Koppa et al.

[11] 4,276,800
[45] Jul. 7, 1981

[54] ROTARY CUTTER FOR SCORING DOUGH SHEETS

[75] Inventors: Daniel A. Koppa, Bloomfield; Agostino J. Aquino, Paterson, both of N.J.

[73] Assignee: Nabisco, Inc., East Hanover, N.J.

[21] Appl. No.: 140,956

[22] Filed: Apr. 16, 1980

[51] Int. Cl.³ .............................................. A21C 11/00
[52] U.S. Cl. ....................................... 83/863; 83/887; 83/100; 83/682; 425/289; 425/298
[58] Field of Search .................................. 83/862–865, 83/887, 98–100, 682, 684, 667, 669; 425/290, 289, 291, 294, 298–300

[56] References Cited

U.S. PATENT DOCUMENTS

| | | | |
|---|---|---|---|
| 641,725 | 1/1900 | Peters | 425/289 |
| 705,041 | 7/1902 | Copland | 425/289 |
| 2,887,964 | 5/1959 | Griner | 425/289 |
| 3,880,030 | 4/1975 | Rosengren | 83/863 |

Primary Examiner—J. M. Meister
Attorney, Agent, or Firm—Gerald Durstewitz

[57] ABSTRACT

A plurality of cruciform cutter members are arranged on a drum to define transverse and circumferential lines along which dough sheet scoring is effected. The members are formed with dough scoring edges along each of the arms thereof and a cutting element at the center to cut a piece from the dough sheet at each intersection of the scoring lines. Air passageways leading to the cutting elements are alternately connected to a vacuum source for removing the cut dough piece from the dough sheet and to a pressure source for removing to dough piece from the element.

4 Claims, 17 Drawing Figures

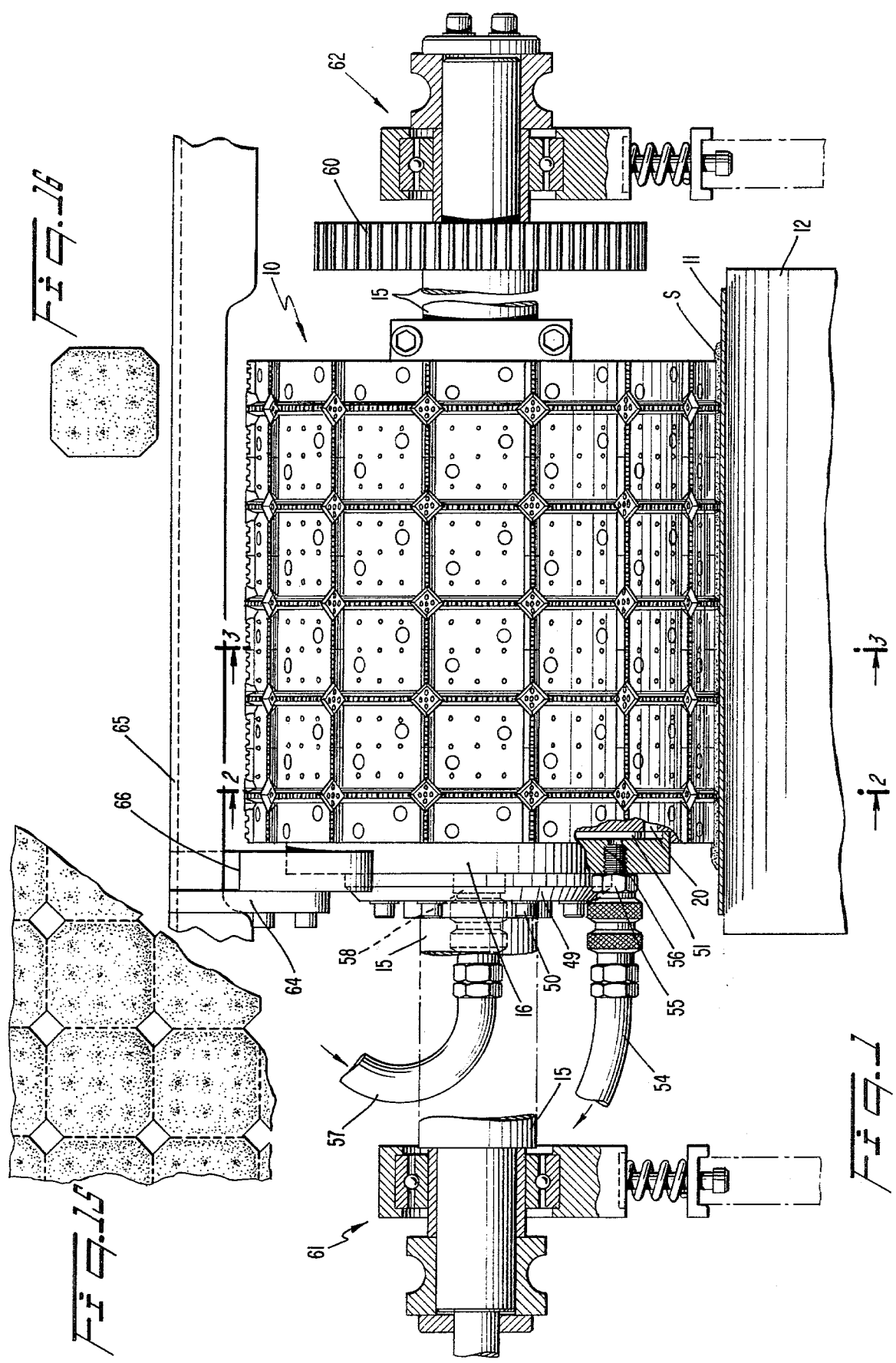

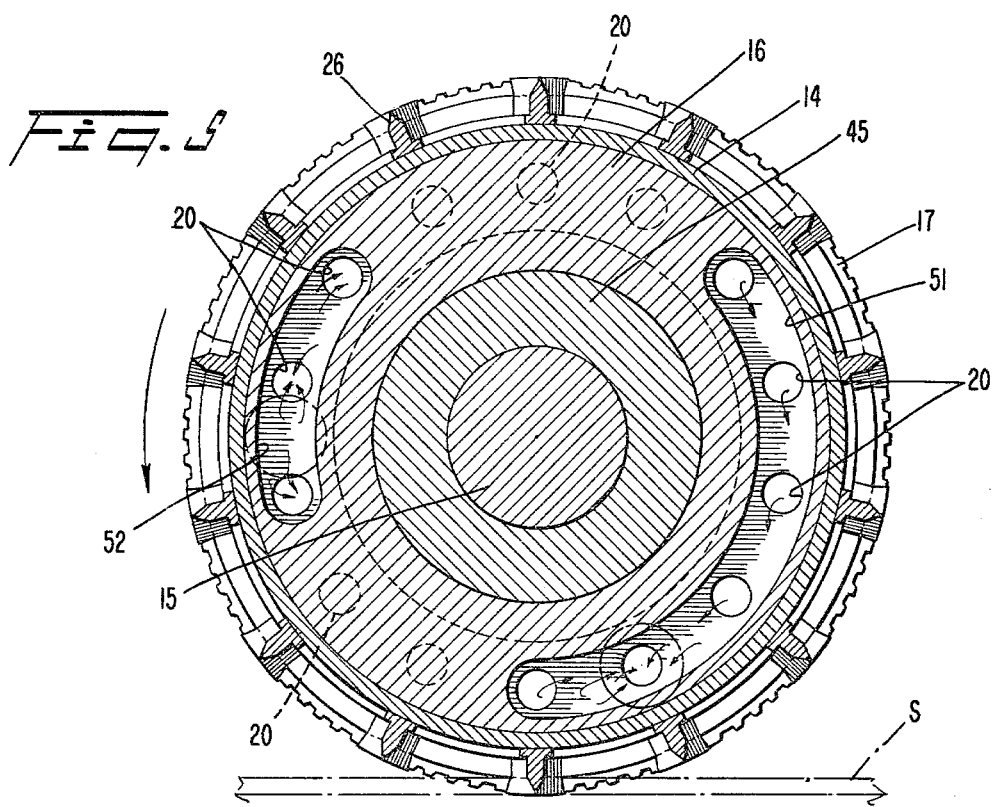
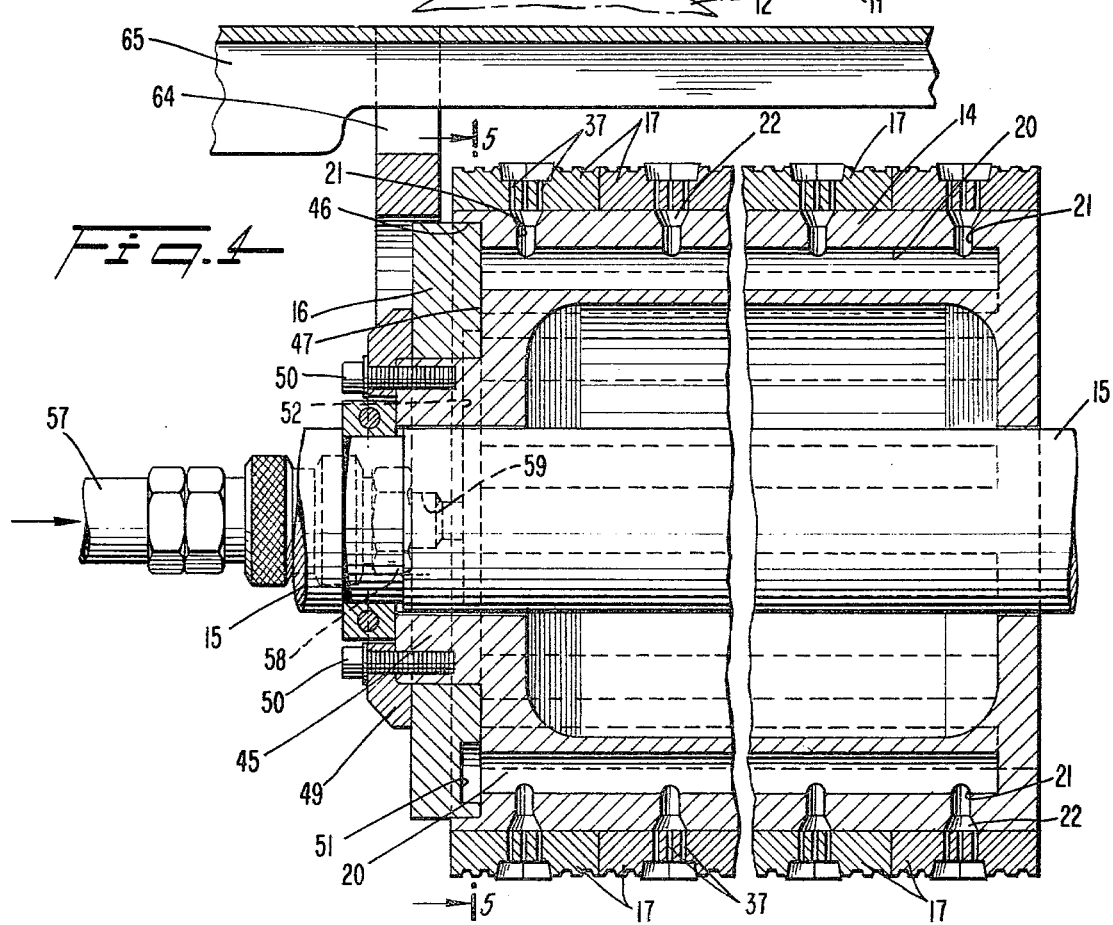

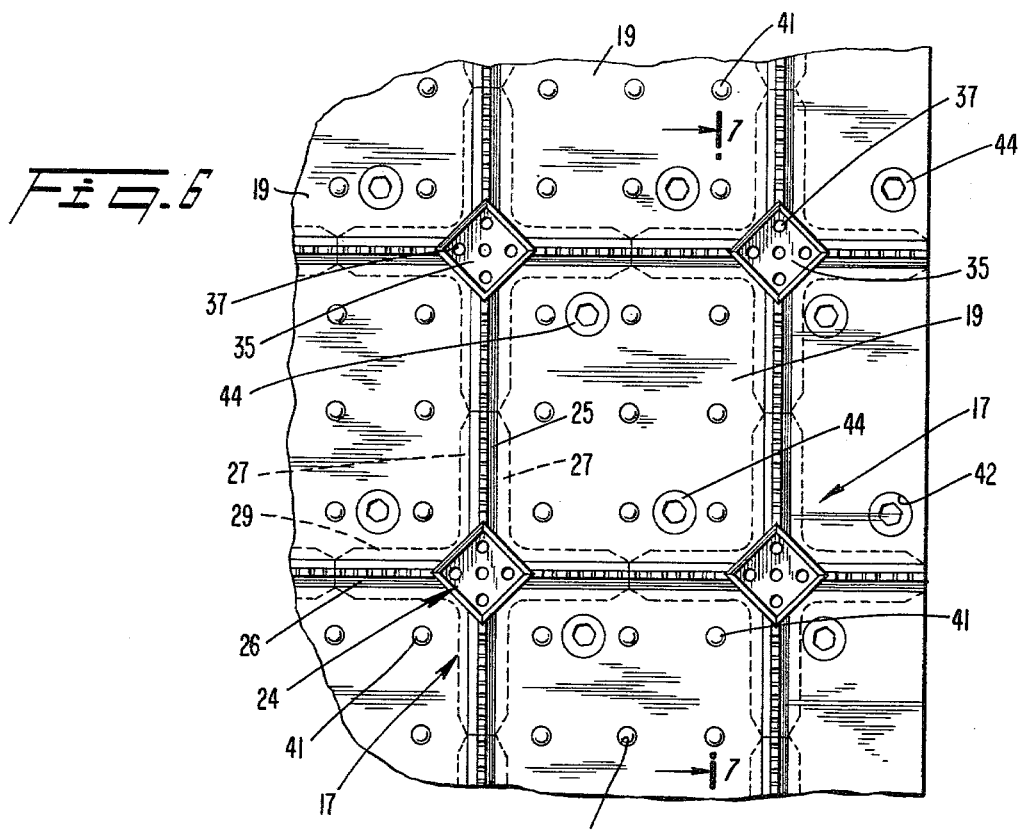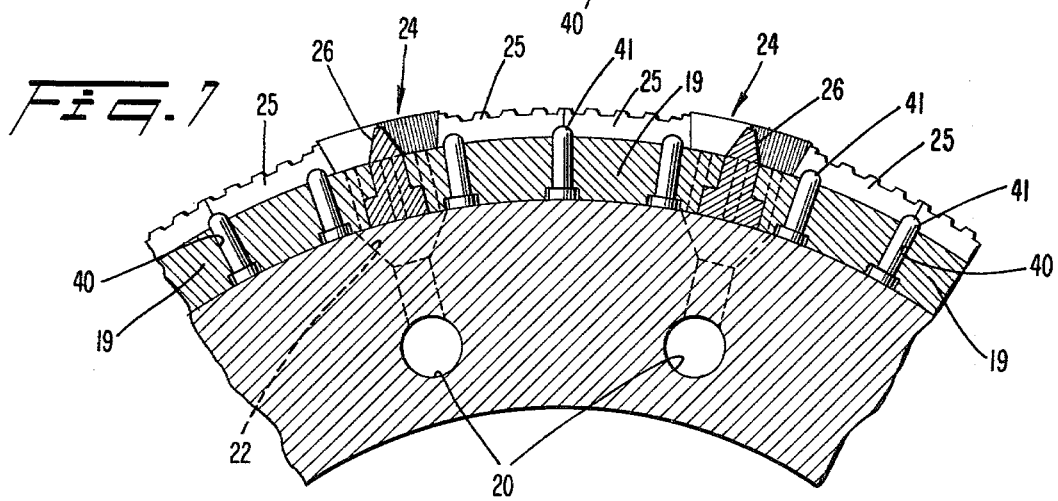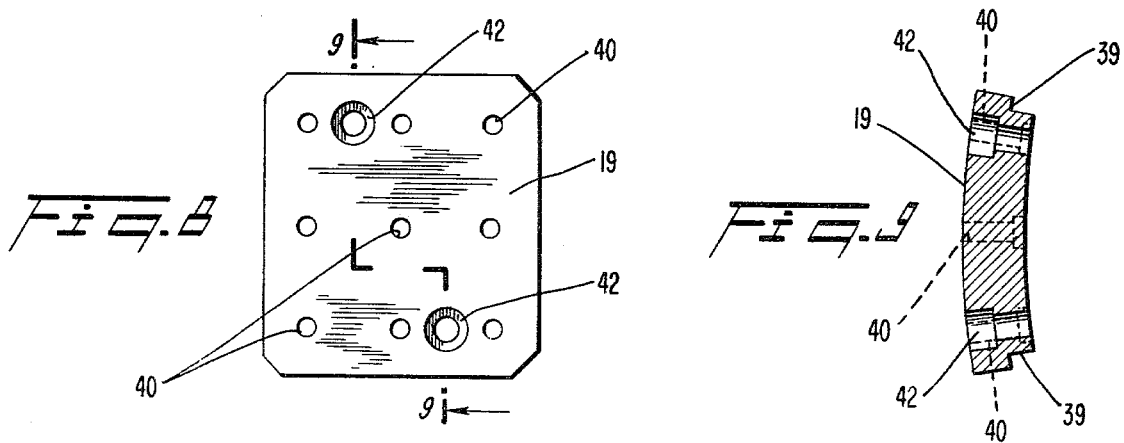

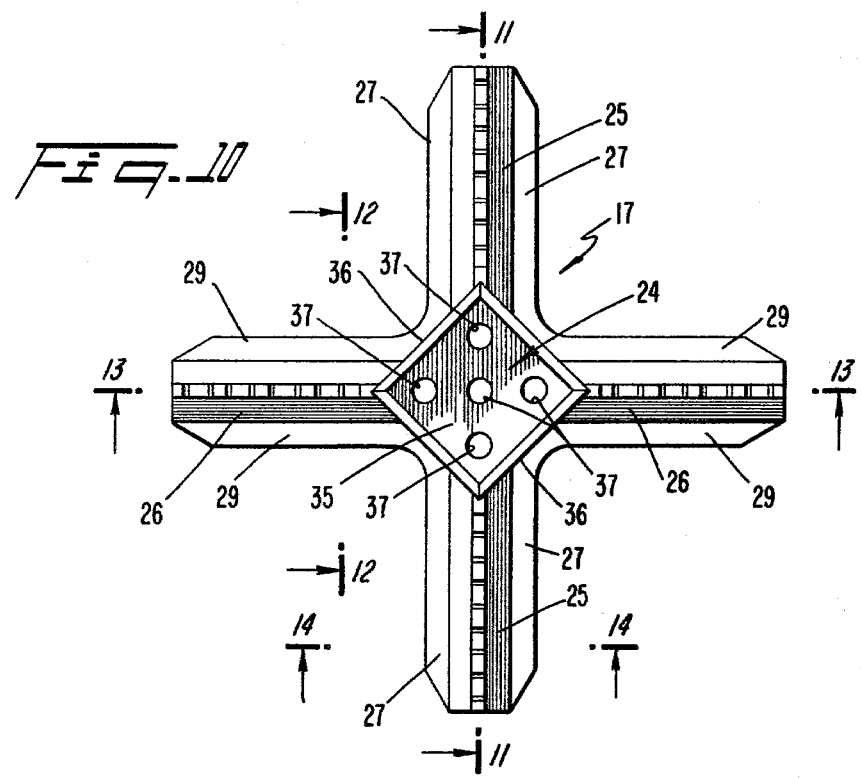
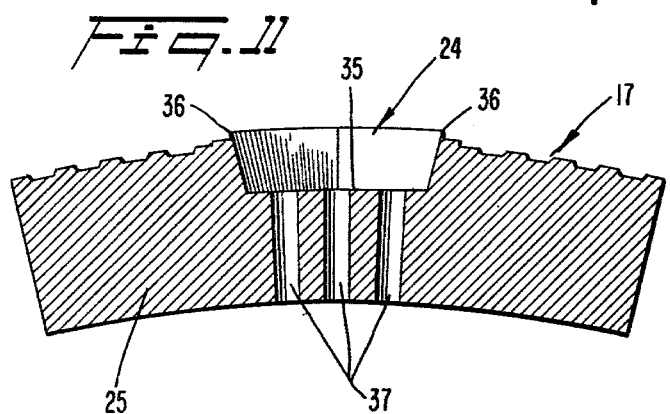
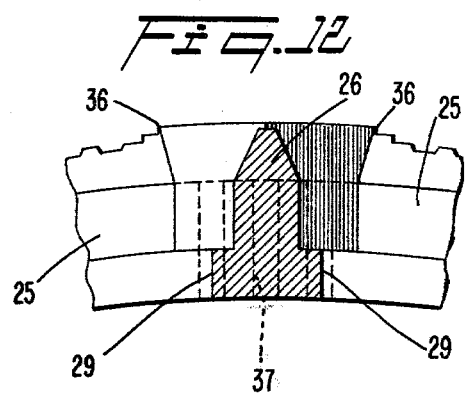
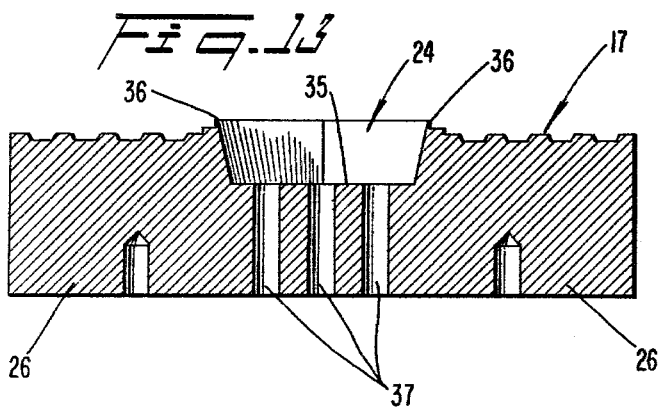
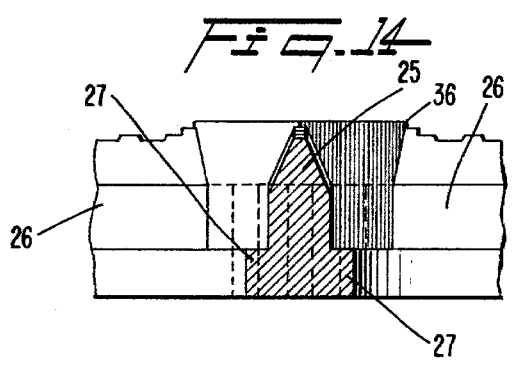

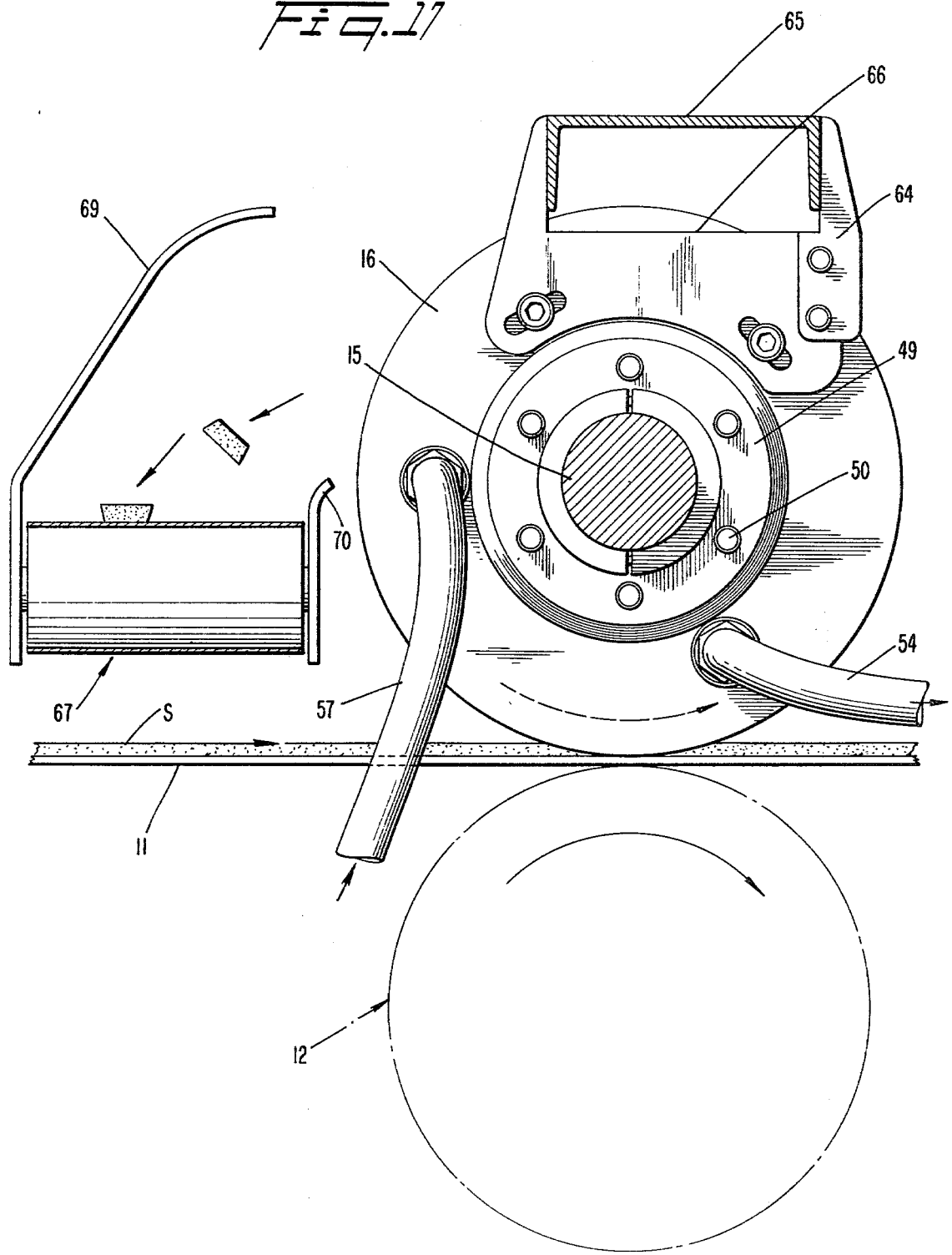

ROTARY CUTTER FOR SCORING DOUGH SHEETS

BACKGROUND OF THE INVENTION

The present invention relates to apparatus for cutting and scoring a dough sheet to separate the dough sheet into a plurality of individual biscuits, crackers, or the like. More particularly, this invention relates to rotating cylindrical cutters designed to act upon a constantly advancing sheet of dough that is moving beneath the cutter by a fabric conveyor belt.

Rotary cutters for this purpose are formed with scoring members arranged on the surface of a drum to divide the surface into a plurality of areas, each having the size and shape of a single biscuit or cracker. The dough sheet passing under the cutter is partially severed by the scoring members to mark out on the sheet many biscuit sized pieces. After the sheet of dough is baked, the baked sheet is broken along the score lines to produce the individual biscuits.

The biscuits, crackers, etc. produced with the use of such apparatus have been rectangular with sharp corners. Rotary cutters which are used for this shape biscuit are shown in U.S. Pat. Nos. 2,887,964 and 3,880,030.

SUMMARY OF THE INVENTION

It is an object of the present invention to provide a rotary cutter for producing biscuits, crackers, and the like, having a configuration requiring the removal of dough.

It is another object of the present invention to provide such a cutter for producing rectangular baked goods having clipped corners.

The foregoing object is accomplished by providing a rotary cutter assembly comprising a drum with a plurality of cruciform shaped members arranged on the face of the drum, the members having dough scoring arms positioned along intersecting lines and center portions formed to cut out dough pieces at the intersections of said lines, and means for alternately connecting vacuum and pressure to the center portions to remove the dough pieces from the dough sheet.

BRIEF DESCRIPTION OF THE DRAWINGS

A preferred embodiment of the invention has been chosen for purposes of illustration and description, and is shown in the accompanying drawings forming a part of the specification, wherein:

FIG. 1 is an elevational view of a rotary cutter assembly in accordance with the present invention shown acting on a dough sheet being transported by a conveyor belt, FIG. 4 is a longitudinal sectional view of the assembly shown in FIG. 1, FIG. 5 is a cross sectional view taken along line 5—5 on FIG. 4, FIG. 6 is an enlarged view of a portion of FIG. 1, FIG. 7 is a sectional view taken along the line 7—7 on FIG. 6, FIG. 8 is a plan view of one of the docker blocks of the assembly, FIG. 9 is a sectional view taken along line 9—9 of FIG. 7.

FIG. 10 is a plan view of one of the cruciform scoring and cutting members of the assembly, FIG. 11 is a sectional view taken along line 11—11 on FIG. 10, FIG. 12 is a sectional view taken along line 12—12 on FIG. 10, FIG. 13 is a sectional view taken along line 13—13 on FIG. 10, FIG. 14 is a sectional view taken along line 14—14 on FIG. 10, FIG. 15 is a plan view of a dough sheet after it has been scored and cut by the assembly of the invention, FIG. 16 is a plan view of the clipped corner, eight sided baked goods produced by use of the subject invention, FIG. 17 is an elevational end view showing a scrap return conveyor adjacent to the rotary cutter.

DESCRIPTION OF THE PREFERRED EMBODIMENT

Figure 3:
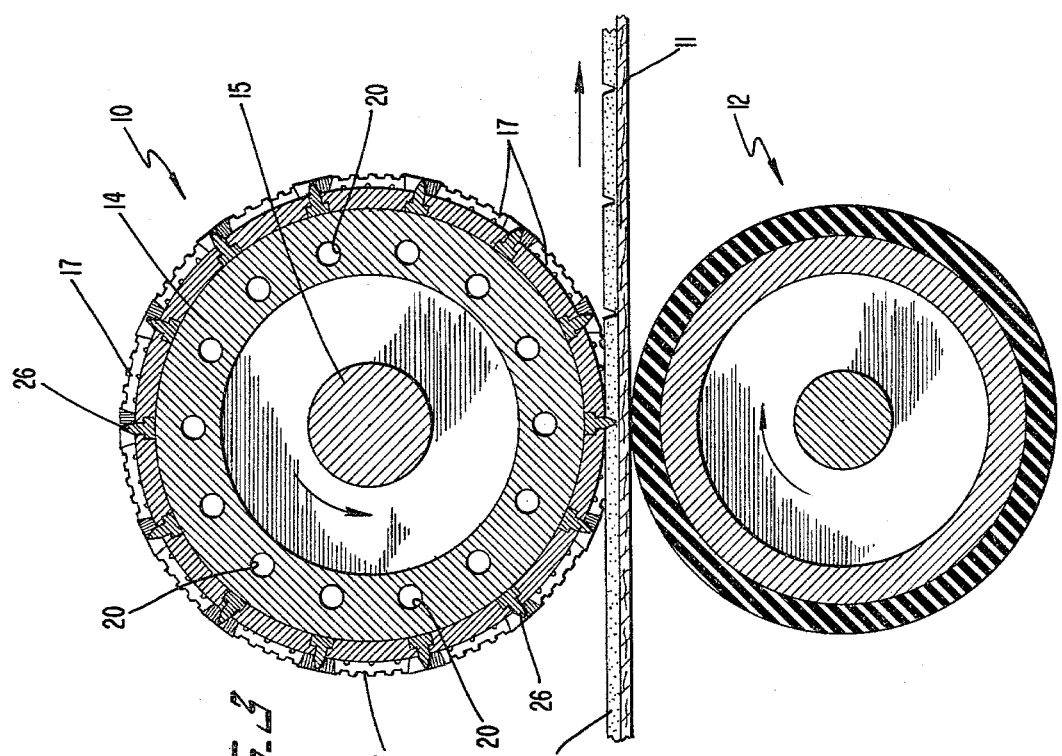
FIG. 3 is a cross sectional view of the assembly taken along line 3—3 on FIG. 1.
Figure 2:
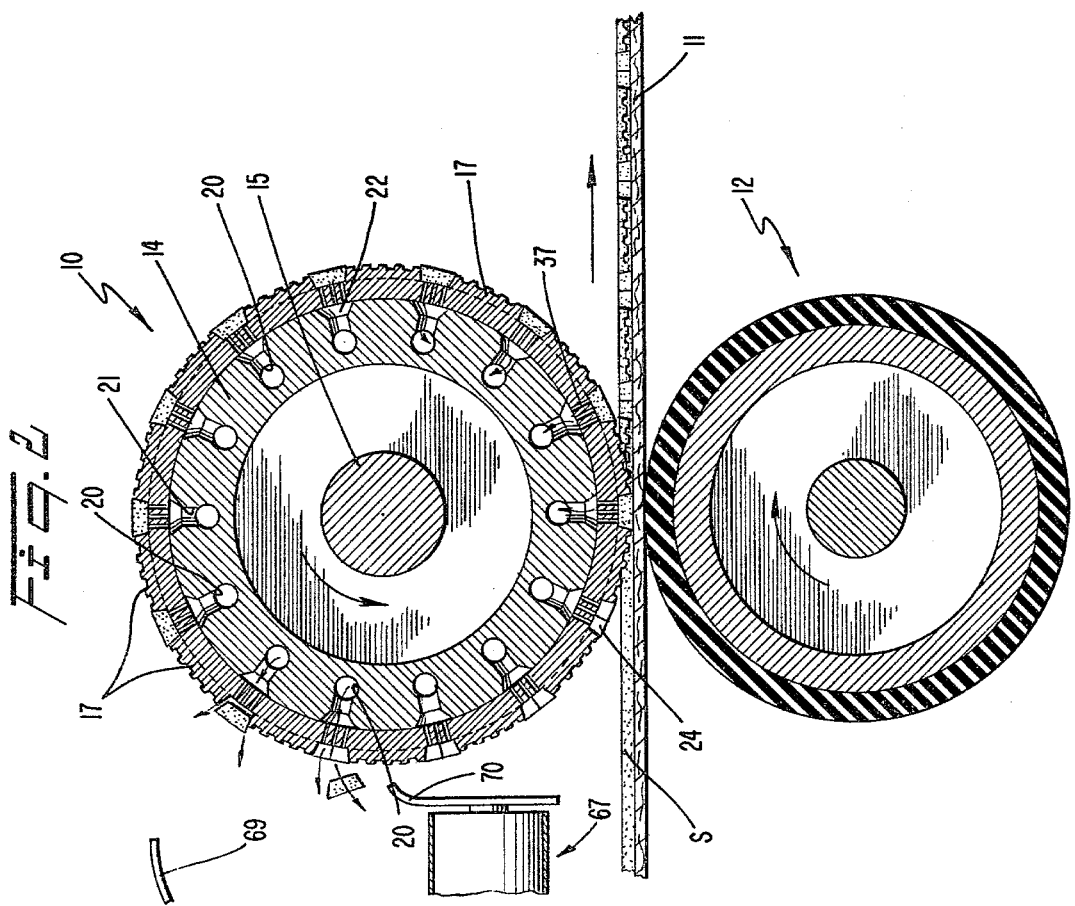
FIG. 2 is a cross sectional view of the assembly taken along line 2—2 on FIG. 1.

Referring to the drawings in detail, there is shown a rotary cutter assembly 10 according to the present invention which, as shown in FIGS. 1-3, operates upon a continuous dough sheet S. The dough sheet transported upon a fabric conveyor belt 11 which passes between the cutter assembly and a rubber surfaced backup roll 12.

The assembly 10 generally includes a cylindrical drum 14 mounted on a driven shaft 15, a stationary manifold plate 16 on one end of the drum 14, a plurality of cruciform dough scoring and cutting elements 17 positioned on the surface of the drum, and a plurality of docker blocks 19 holding the elements 17 in place.

As particularly shown in FIGS. 2-5, the drum 14 is provided with a plurality of equally spaced bores 20 extending parallel to the axis of the drum. The bores extend from the manifold plate 16 and terminate short of the opposite end of the drum as shown in FIG. 4. Along each bore 20 is provided a plurality of spaced radially oriented passageways 21 extending outwardly from the bore 20 to a tapered port 22 in the surface of the drum 14.

The cruciform members 17, which are shown in detail in FIGS. 10-14, are formed with four arms and a center portion 24. Two arms 25 extend in opposite directions from the center portion 24, and as shown in FIG. 11, curve to extend circumferentially along the surface of drum 14. The other two arms 26 are at right angles to the arms 25 and are shaped to extend longitudinally along the surface of the drum.

The arms 25 and 26 respectively have base flanges 27 and 29 and upright ridge portions 30 and 31 which taper to serrated scoring edges 32 and 34.

The central portion 24 is formed with a diamond shaped recess 35 surrounded by a dough cutting edge 36. Parallel passageways 37 extend from the corners and center of the floor of the recess 35 through the base of the portion 24.

As shown best in FIGS. 1 and 6, the cruciform members 17 are positioned on the surface of the drum with the passageways 37 positioned over the ports 22, the arms 25 aligned to to form circumferential scoring lines, and the arms 26 aligned to define transverse scoring lines.

The docker blocks 19, shown in FIGS. 8 and 9, are curved to match the contour of the drum and are formed with notches 39 running along each edge thereof to mate with the flanges 26 and 29 of the cruciform members. The docker blocks are formed with a plurality of countersunk holes 40 for accepting docker pins 41, and two countersunk holes 42 for receiving mounting screws 44.

Referring to FIGS. 1, 4 and 5, the manifold plate 16 is annular and is mounted on a neck 45 extending from the drum 14. The end of the drum is formed with an annular recess 46 in which the plate 16 is seated. The plate 16 is held against the face 47 of the recess by a collar 49 mounted on the end of the neck 45 by machine screws 50. The manifold plate 16 is formed with a long arcuate vacuum port 51 and a shorter arcuate pressure port 52. As best shown in FIG. 5, the arcuate ports are aligned with the open ends of the bores 20 to sequentially place the bores in communication with the ports as the drum 14 rotates. A vacuum hose 54 (FIG. 1) is connected to the port 51 by means of a fitting 55 threaded into a bore 56 provided in the plate 16. A pressure hose 57 is similarly connected to the port 52 through a fitting 58 and a bore 59 (FIG. 4) in the plate 16.

Referring to FIG. 1, the shaft 15 is driven through a gear 60 and is journaled at its ends in resiliently mounted frame members 61 and 62. The plate 16 is held against rotation by the interaction of a manifold lock member 64 and a transverse frame member 65 (FIGS. 1 and 17). The lock 64 is bolted to the manifold plate 16 and is formed with a recess 66 which slideably engages the frame member 65.

As shown in FIG. 17, a scrap return conveyor 67 is positioned along the length of the cutter 10 above and at right angles to the conveyor belt 11. A deflector plate 69 extends along the side of the conveyor furthest from the cutter 10 and a scrap guide plate 70 is place between the conveyor 67 and the face of the cutter.

In operation, the drum 14 of the assembly 10 is driven through the gear 60 as the dough sheet S is carried on the conveyor belt 11 between the drum 14 and the backup roll 12. The peripheral speed of the drum is matched to the linear speed of the dough sheet. The rotation of the drum brings each row of cruciform elements sequentially into contact with the moving dough sheet to produce a continuous pattern in the dough sheet. Each of the scoring edges 32 and 34 of the cruciform elements outline the crackers as they are pressed into the dough sheet.

As the centers 24 of the cruciform elements 10 are pressed into the dough sheet, the cutting edges 36 thereof cut out diamond shaped dough pieces at the intersections of the edge lines of the crackers. As the dough pieces are cut, the open end of the bore 20 associated with the that row of cruciform elements is placed in alignment with the arcuate vacuum port 51 (FIG. 5). The vacuum is communicated through the bore 20, the passageways 21, the ports 22, and the passageways 37, into the recesses 35. The cut dough pieces are thereby held within the recesses by the vacuum until the rotation of the drum brings those recesses to a position where the dough pieces are held in place by gravity.

The continued rotation of the drum brings the end of each bore 20 into alignment with the arcuate pressure port 52. Compressed air is then introduced into the bore and the dough pieces are blown from the recesses onto the scrap return conveyor.

The dough sheet is passed through a band oven and is broken along the score lines after baking to form the individual crackers.

It will be seen from the foregoing that the present invention provides a rotary cutter for producing biscuits, crackers, and the like, having a configuration requiring removal of a dough piece from the dough sheet, such as rectangular baked goods having clipped corners.

What is claimed is:

1. A rotary cutter assembly for cutting and scoring a sheet of dough for producing crackers of the like with clipped corners, said assembly comprising in combination a drum, a plurality of cruciform shaped members arranged upon the face of said drum, each cruciform member having four arms and a center portion at the junction of said arms, said center portion having a dough cutting egge defining an enclosed area to cut from the dough sheet a piece of dough having the shape of the enclosed area, said arms each having a dough scoring edge running outwardly from said dough cutting edge, said cruciform members being arranged so that said arms are positioned along intersecting lines with the center portions positioned at the intersections of said lines, means for applying a vacuum to said center portions to hold the cut dough pieces within the center portions and lift them from the dough sheet, means for applying a positive pressure to said center portion to expell said dough pieces, and means for receiving the dough pieces and carrying them away from the dough sheet.

2. The cutter assembly of claim 1 including block members secured to said drum for holding said cruciform members in place upon the drum, said cruciform members being formed with base flanges, the base edges of said blocks being notched to receive said base flanges and said blocks being positioned to overlie and engage said base flanges, and means for attaching said blocks to said drum.

3. The cutter assembly of claim 1 or 2 wherein said cruciform members are arranged in rows extending along the surface of the drum from end to end, said drum is provided with a bore extending parallel to each of the rows of cruciform members from the surface of one end of the drum toward the opposite end, passageway means extending from said bore to the center portion of each cruciform member in the row, and a stationary manifold plate positioned against said end surface of the drum, said plate having vacuum and pressure ports arranged to sequentially communicate with said bores as the drum rotates.

4. The cutter assembly of claim 3 wherein said manifold plate has a surface engaging said end surface of the drum, said vacuum and pressure ports comprising arcuate recesses in said surface of said plate, said arcuate recesses extending along the circular path of travel of the ends of the bores.

* * * * *